(12) United States Patent
Richardson et al.

(10) Patent No.: US 8,485,543 B2
(45) Date of Patent: Jul. 16, 2013

(54) INDEPENDENT SUSPENSION AND STEERING ASSEMBLY

(75) Inventors: Gregory A. Richardson, Nixa, MO (US); John A. Hinz, Monticello, IN (US); Richard Lee Conaway, Grand Haven, MI (US)

(73) Assignee: Reyco Granning, LLC, Mount Vernon, MO (US)

( * ) Notice: Subject to any disclaimer, the term of this patent is extended or adjusted under 35 U.S.C. 154(b) by 282 days.

(21) Appl. No.: 12/799,469

(22) Filed: Apr. 26, 2010

(65) Prior Publication Data

US 2010/0276901 A1 Nov. 4, 2010

Related U.S. Application Data

(60) Provisional application No. 61/214,834, filed on Apr. 29, 2009.

(51) Int. Cl.
*B60G 3/28* (2006.01)
*B60G 11/46* (2006.01)

(52) U.S. Cl.
USPC ...... 280/124.171; 280/124.109; 280/124.125; 280/124.167; 280/124.175

(58) Field of Classification Search
USPC ............. 280/93.502, 93.512, 124.1, 124.109, 280/124.125, 124.134, 124.135, 124.151, 280/124.157, 124.163, 124.171, 124.172, 280/124.173, 124.174, 124.175, 124.176
See application file for complete search history.

(56) References Cited

U.S. PATENT DOCUMENTS

| | | | | |
|---|---|---|---|---|
| 1,976,409 | A | * | 10/1934 | Nutt ..................... 280/124.127 |
| 2,069,420 | A | | 2/1937 | Paton |
| 3,257,123 | A | * | 6/1966 | Giovinazzo ............ 280/124.141 |
| 3,913,941 | A | * | 10/1975 | Guerriero et al. ...... 280/124.145 |
| 4,288,096 | A | * | 9/1981 | Enokimoto et al. ... 280/124.136 |
| 4,313,618 | A | * | 2/1982 | Robinson ............... 280/124.134 |
| 4,422,666 | A | * | 12/1983 | Proctor .................. 280/86.757 |
| 4,458,918 | A | * | 7/1984 | Rumpel .................. 280/124.143 |
| 4,546,997 | A | * | 10/1985 | Smyers ..................... 280/5.509 |
| 4,779,894 | A | * | 10/1988 | Cowburn ................ 280/124.134 |
| 4,813,704 | A | * | 3/1989 | Smith ..................... 280/124.109 |
| 4,854,606 | A | | 8/1989 | de Goncourt et al. |
| 4,867,474 | A | | 9/1989 | Smith |
| 4,887,841 | A | * | 12/1989 | Cowburn et al. ....... 280/124.109 |
| 4,903,984 | A | | 2/1990 | Kajiwara et al. |
| 4,997,202 | A | | 3/1991 | Kitagawa et al. |
| 5,058,918 | A | | 10/1991 | Nakaya et al. |
| 5,141,209 | A | * | 8/1992 | Sano et al. ................... 267/36.1 |
| 5,251,930 | A | * | 10/1993 | Kusaka et al. ........... 280/124.14 |
| 5,833,026 | A | * | 11/1998 | Zetterstrom et al. .......... 180/360 |
| 6,390,486 | B1 | | 5/2002 | Boes et al. |

(Continued)

*Primary Examiner* — Paul N Dickson
*Assistant Examiner* — Barry Gooden, Jr.
(74) *Attorney, Agent, or Firm* — George Pappas

(57) ABSTRACT

An independent suspension and steering system that can be used with a large truck. The suspension system includes a transversely extending leaf spring assembly. The midpoint of the leaf spring assembly is secured at the centerline of the vehicle while the two opposing ends of the leaf spring assembly are shackled to vertically moveable carriers on which the steering knuckles are pivotally mounted. The steering unit includes a transversely extending relay rod which is attached to tie rods at its opposite ends. The tie rods are, in turn, attached to the steering knuckles. In some embodiments, at least one steering gear is coupled with the relay rod via a connecting rod that is secured at one end to the rotating output shaft of the steering gear and secured at its other end to the relay rod.

29 Claims, 13 Drawing Sheets

U.S. PATENT DOCUMENTS

| | | | |
|---|---|---|---|
| 6,457,729 B2 * | 10/2002 | Stenvall | 280/124.134 |
| 6,588,779 B2 * | 7/2003 | Sandahl et al. | 280/124.135 |
| 6,832,773 B2 * | 12/2004 | Yokoyama | 280/124.171 |
| 6,863,290 B2 * | 3/2005 | Yokoyama | 280/124.171 |
| 7,516,968 B2 * | 4/2009 | Cortez et al. | 280/124.116 |
| 7,971,890 B2 * | 7/2011 | Richardson | 280/124.163 |
| 2001/0042967 A1 * | 11/2001 | Stenvall | 280/124.163 |
| 2002/0043780 A1 * | 4/2002 | Sandahl et al. | 280/124.135 |
| 2003/0234506 A1 * | 12/2003 | Yokoyama | 280/124.171 |
| 2004/0051262 A1 | 3/2004 | Young | |
| 2005/0023792 A1 | 2/2005 | Miller et al. | |
| 2007/0075513 A1 * | 4/2007 | Caron | 280/124.1 |
| 2007/0131474 A1 * | 6/2007 | Zetterstroem | 180/411 |
| 2008/0252033 A1 * | 10/2008 | Platner et al. | 280/124.163 |
| 2009/0218780 A1 * | 9/2009 | Mauz | 280/124.109 |
| 2010/0123296 A1 * | 5/2010 | Chelgren | 280/124.1 |
| 2011/0079978 A1 * | 4/2011 | Schreiner et al. | 280/124.1 |

* cited by examiner

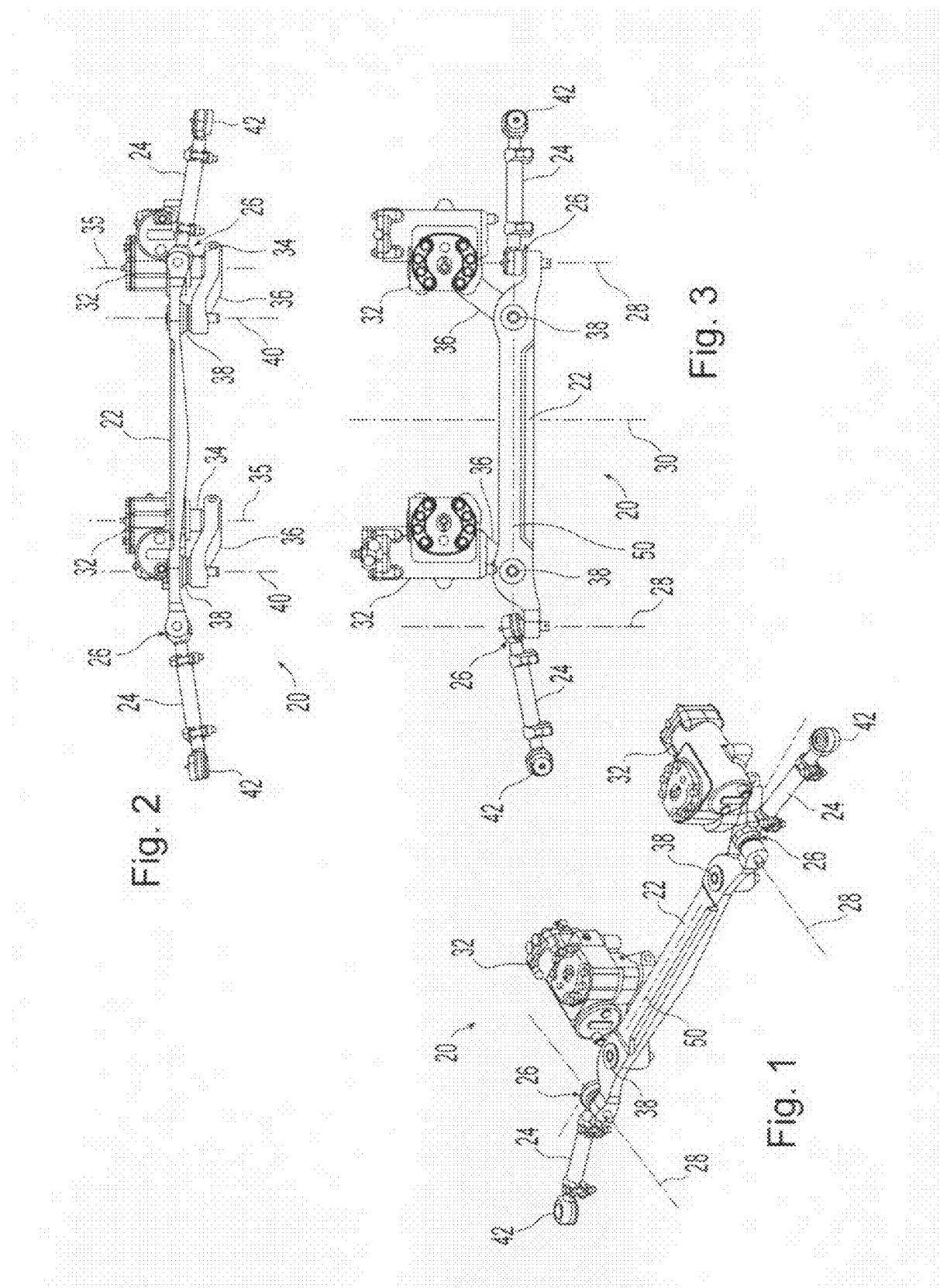

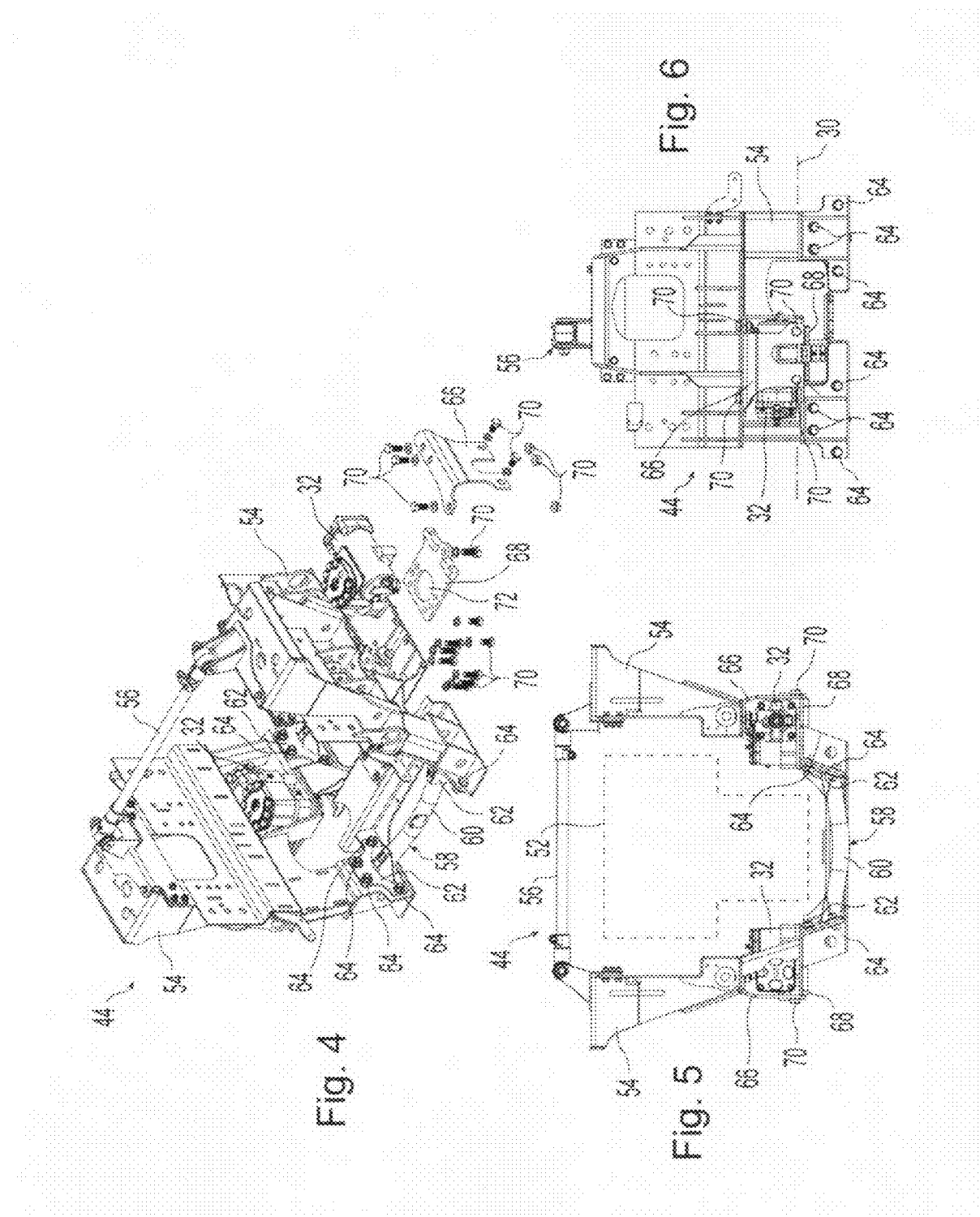

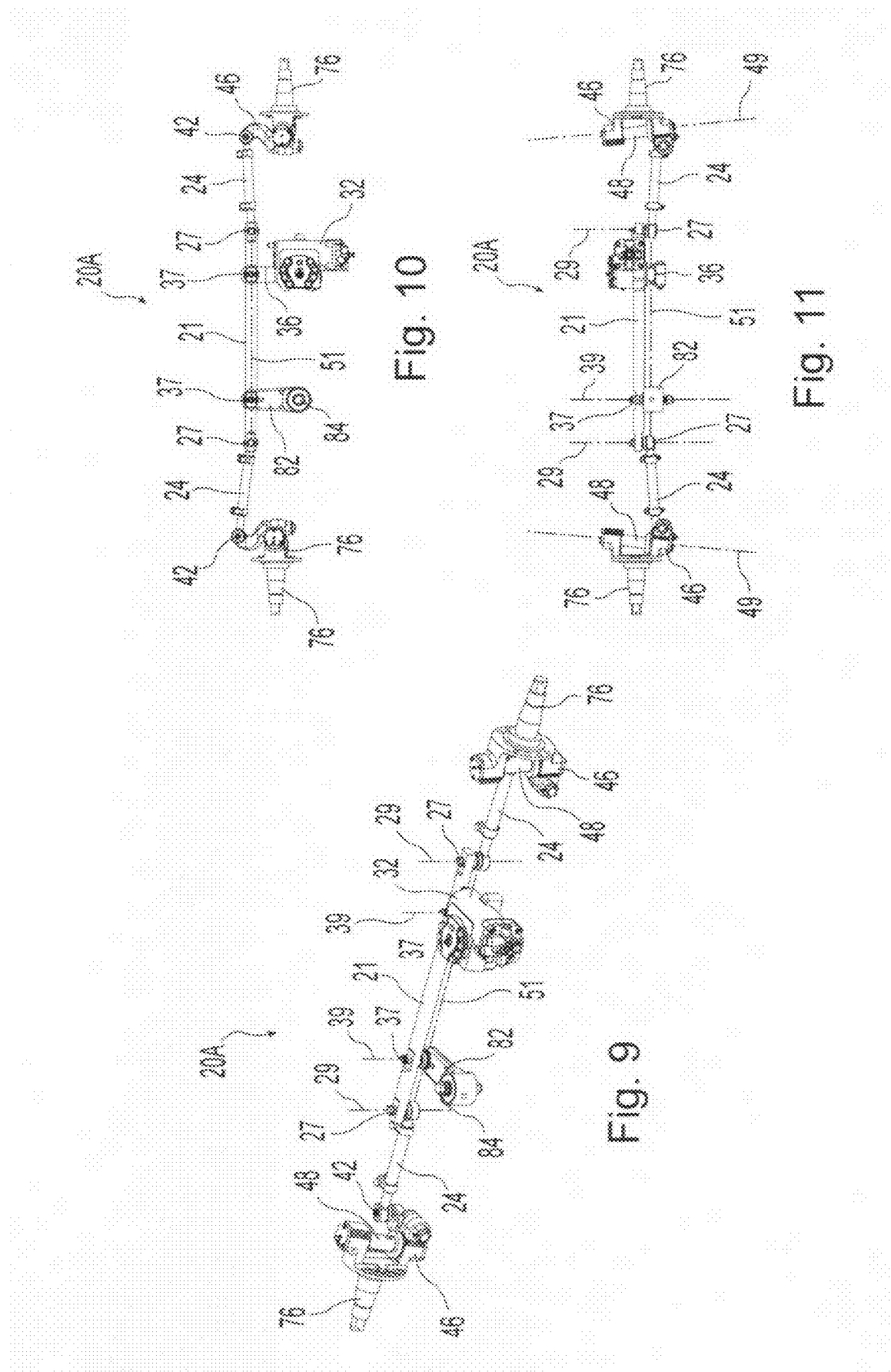

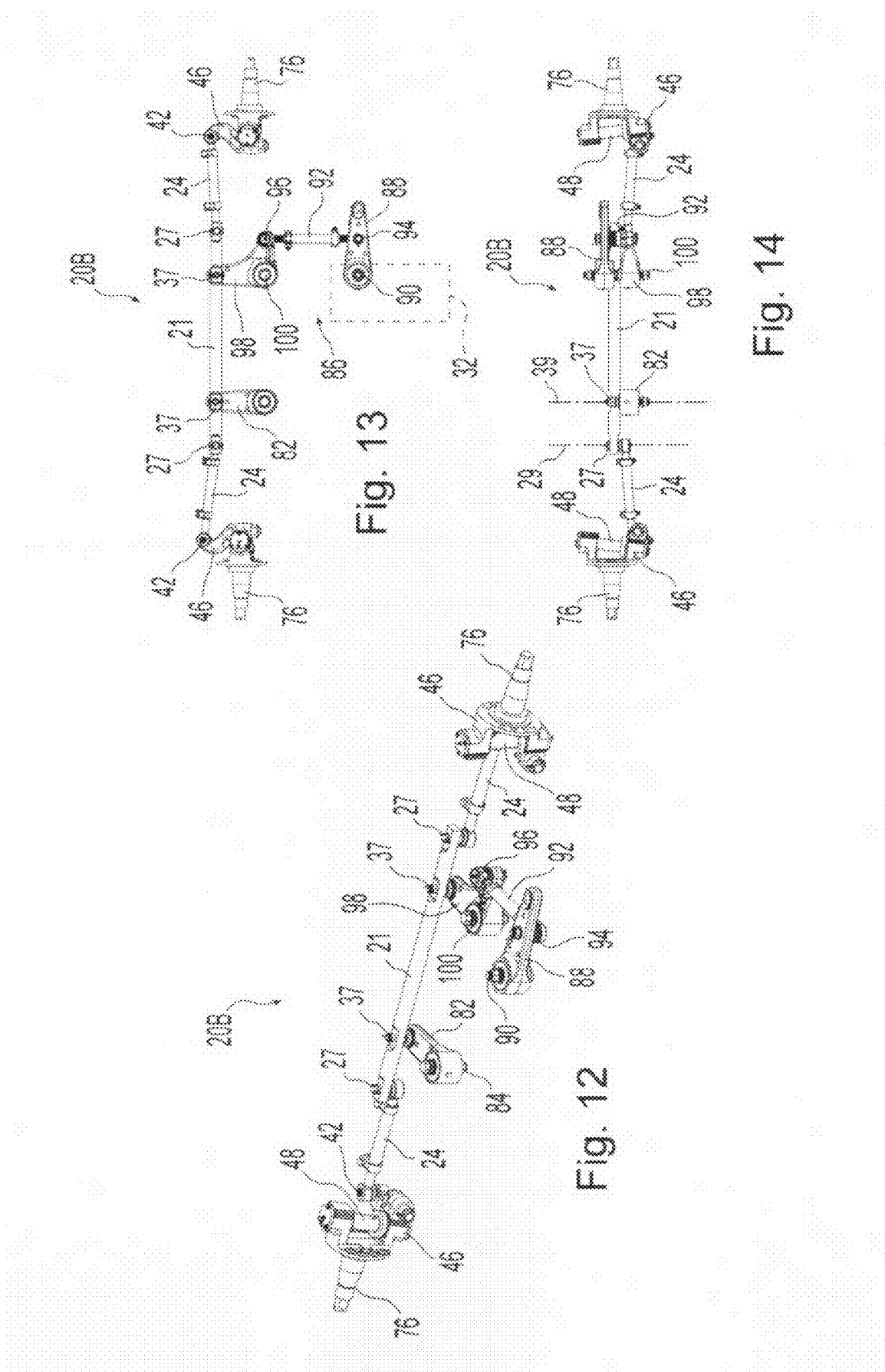

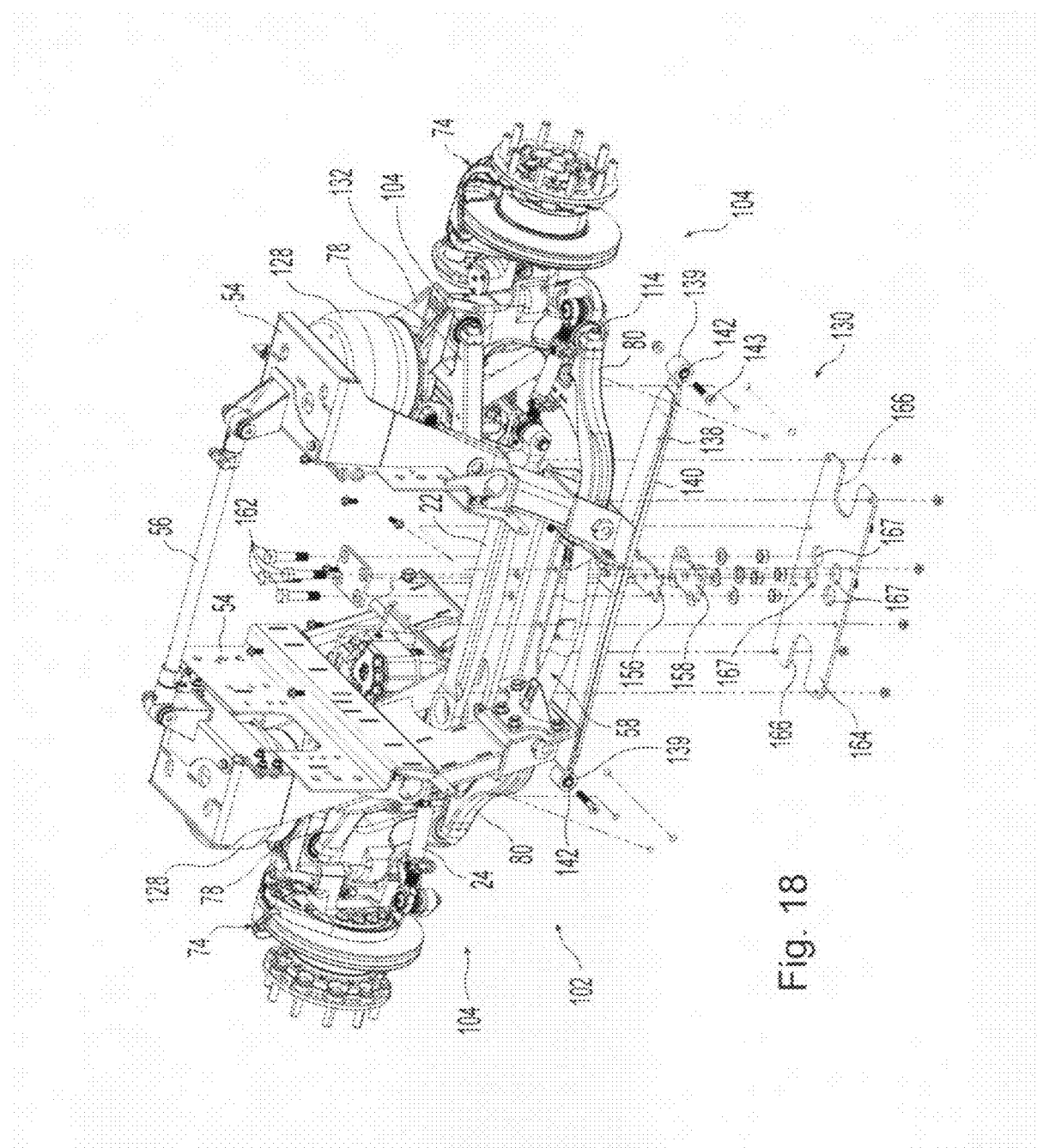

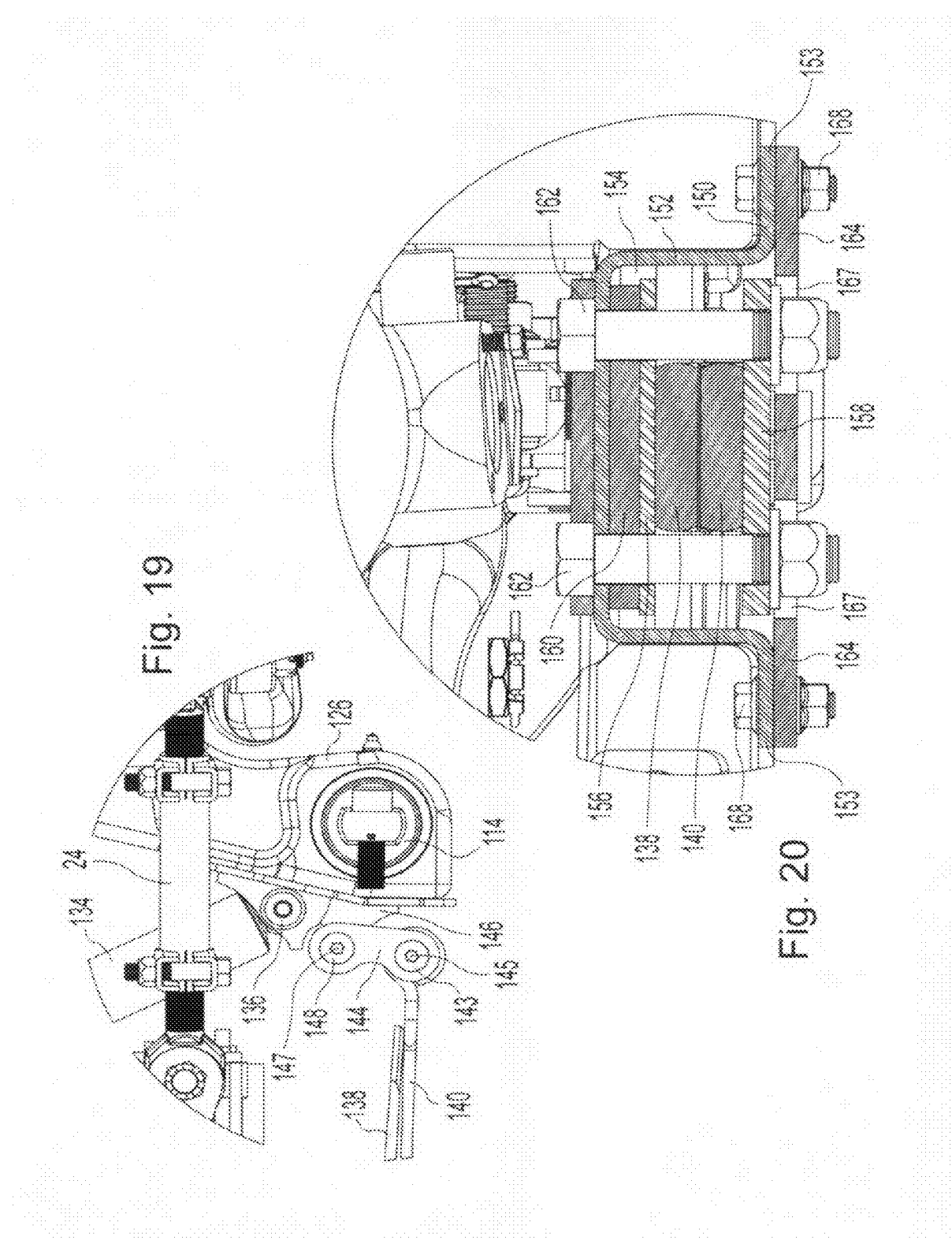

INDEPENDENT SUSPENSION AND STEERING ASSEMBLY

CROSS REFERENCE TO RELATED APPLICATIONS

This application claims priority under 35 U.S.C. 119(e) of U.S. provisional patent application Ser. No. 61/214,834 filed on Apr. 29, 2009 entitled INDEPENDENT SUSPENSION AND STEERING ASSEMBLY the disclosure of which is hereby incorporated herein by reference.

BACKGROUND OF THE INVENTION

1. Field of the Invention

The present invention relates to independent suspension assemblies and, more particularly, to independent suspension assemblies that can be used with the steerable wheels of a vehicle.

2. Description of the Related Art

Steering suspensions for heavy duty trucks such as, semi-tractor trucks, class 8 trucks, fire trucks, etc., are typically manufactured using a solid axle extending under the truck engine in a generally perpendicular or transverse direction to the longitudinal centerline of the truck. At each end of the rigid axle, spindles are typically pivotally attached with king-pins for pivotally mounting the truck front steering wheels. The vehicle chassis of such rigid front axle suspensions is often supported over the axle using leaf springs and/or air springs. The suspension characteristics of suspension systems having a rigid axle extending across and between the front wheels of the vehicle are generally undesirable because a bump experienced by one of the front wheels causes the entire front axle and, thus, the vehicle to move in response to the bump.

Independent front suspension systems for large trucks are known. The incorporation of independent front suspension systems in a large truck, however, is difficult. One of the difficulties presented is that the engines of such large trucks often extend between and below the truck chassis frame members into the same space where independent front suspension components are typically located. An improved independent suspension assembly that can be used with the steerable wheels of a large truck remains desirable.

SUMMARY OF THE INVENTION

The present invention provides an improved independent suspension and steering system that can be used with large trucks such as semi-tractor trucks, class 8 trucks, fire trucks, etc., and which is rated for load capacities in excess of 18,000 pounds. The improved independent suspension and steering system can be used on both front and rear engine vehicles.

The present invention comprises, in one form thereof, an independent suspension system for a pair of steerable wheels which includes a vehicle chassis defining a longitudinally extending vehicle centerline and a transversely extending leaf spring assembly. The leaf spring assembly is fixedly secured proximate a transverse midpoint of the leaf spring assembly to the chassis proximate the vehicle centerline. The leaf spring assembly includes opposing ends wherein each of the opposing ends are vertically displaceable relative to the transverse midpoint. The chassis also includes a pair of knuckle carriers and a pair of steering knuckles. Each of the knuckle carriers are relatively vertically moveably mounted on the chassis with each of the opposing ends of the leaf spring assembly being pivotally coupled with a respective one of the knuckle carriers whereby vertical movement of the knuckle carriers is dampened. The steering knuckles are adapted to have the steerable wheels mounted thereon with each of the steering knuckles being pivotally supported on a respective one of the knuckle carriers.

The present invention comprises, in another form thereof, an independent suspension system for a pair of steerable wheels. The independent suspension system includes a vehicle chassis, a transversely extending leaf spring assembly, a pair of knuckle carriers, a pair of shackles and a pair of steering knuckles. The vehicle chassis defines a longitudinally extending vehicle centerline. The leaf spring assembly is fixedly secured to the chassis and includes opposing ends with each of the opposing ends being vertically displaceable relative to the chassis. Each of the knuckle carriers is relatively vertically moveably mounted on the chassis. Each of the shackles is pivotally coupled to one of the opposing ends of the leaf spring assembly with a first pivotal joint and is pivotally coupled to a respective one of the knuckle carriers with a second pivotal joint. The first and second pivotal joints define pivot axes that are parallel and spaced apart on each of the shackles. The steering knuckles are adapted to have the steerable wheels mounted thereon with each of the steering knuckles being pivotally supported on a respective one of the knuckle carriers.

The invention comprises, in still another form thereof, an independent suspension system for a pair of steerable wheels. The independent suspension system includes a vehicle chassis, a transversely extending leaf spring assembly, a pair of control arms, a pair of knuckle carriers and a pair of steering knuckles. The vehicle chassis defines a longitudinally extending vehicle centerline. The leaf spring assembly is fixedly secured to the chassis and includes opposing ends with each of the opposing ends being vertically displaceable relative to the chassis. Each of the control arms is pivotally mounted to the chassis and thereby defines a pair of first pivot axes. Each of the knuckle carriers is pivotally coupled to one of the control arms and thereby defines a pair of second pivot axes. Each of the knuckle carriers is also pivotally coupled to one of the opposing ends of the leaf spring assembly thereby defining a pair of third pivot axes. For each of the knuckle carriers, the first, second and third pivot axes are disposed substantially parallel. The knuckle carriers are each vertically moveable relative to the chassis. The steering knuckles are adapted to have the steerable wheels mounted thereon and each of the steering knuckles is pivotally supported on a respective one of the knuckle carriers.

The invention comprises, in another form thereof, a steering unit for a vehicle defining a longitudinal axis and having independent suspension assemblies for a pair of transversely spaced steerable wheels. The steering unit includes a transversely extending relay rod and first and second tie rods respectively coupled to the relay rod at transversely spaced first and second locations. First and second steering knuckles are respectively coupled to the first and second tie rods and are pivotal about substantially vertical knuckle axes. The first and second steering knuckles are also each adapted to support a steerable wheel wherein the first and second tie rods operably couple the relay rod with the first and second steering knuckles such that transverse movement of the relay rod simultaneously pivots the steering knuckles about the knuckle axes. The steering unit also includes at least one steering gear having an output shaft and a connecting rod that operably transmits movement of the output shaft to the relay rod wherein movement of the output shaft transversely displaces the relay rod. The connecting rod is coupled with the relay rod at a first joint positioned transversely between the first and second locations at which the tie rods are coupled to the relay rod.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 1 is perspective view of a steering unit assembly having two steering gears.

FIG. 2 is a front view of the steering unit assembly of FIG. 1.

FIG. 3 is a top view of the steering unit assembly of FIG. 1.

FIG. 4 is a partially exploded perspective view showing the attachment of a steering gear on the chassis.

FIG. 5 is a front view of the chassis.

FIG. 6 is a side view of the chassis.

FIG. 9 is a perspective view of an alternative steering unit assembly having only a single steering gear.

FIG. 10 is a top view of the steering unit assembly of FIG. 9.

FIG. 11 is a front view of the steering unit assembly of FIG. 9.

FIG. 12 is a perspective view of another steering unit assembly.

FIG. 13 is a top view of the steering unit assembly of FIG. 12.

FIG. 14 is a front view of the steering unit assembly of FIG. 12.

FIG. 18 is a partially exploded perspective view showing the attachment of a leaf spring assembly to the chassis.

FIG. 19 is a front view showing the attachment of the leaf spring to a knuckle carrier.

FIG. 20 is a cross sectional view taken along the longitudinal centerline of the vehicle showing the securement of the leaf spring.

Figure 7:
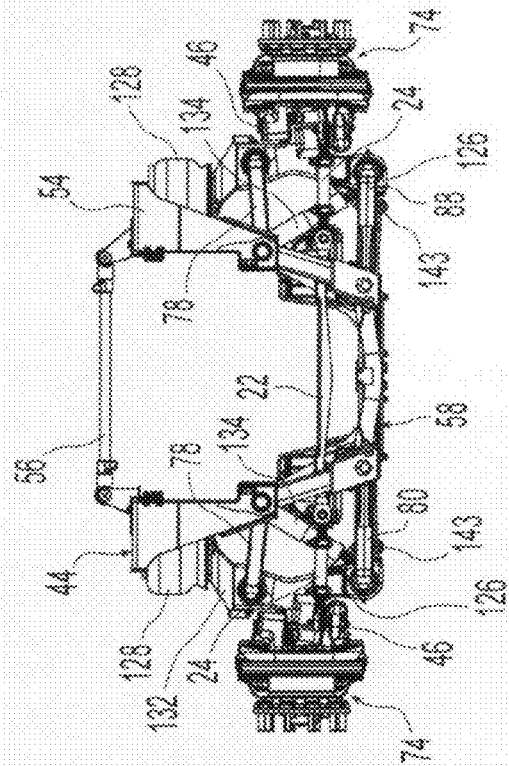
FIG. 7 is a front view of the chassis with the steering unit and front wheel hubs mounted thereon.
Figure 8:
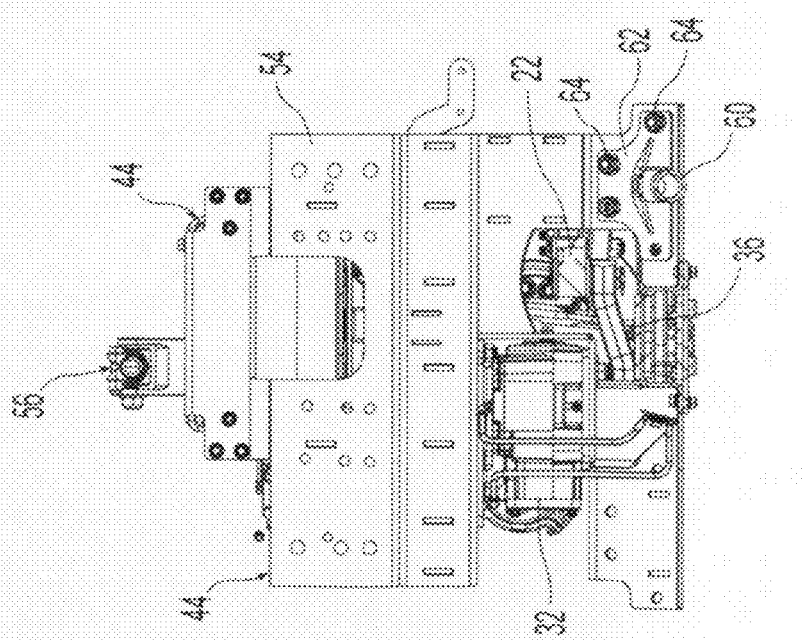
FIG. 8 is a cross sectional view taken along line A-A of FIG. 7.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

A steering unit assembly 20 in accordance with the present invention is shown in FIGS. 1-3. Steering unit assembly 20 includes a transversely extending relay rod 22. The transversely spaced opposite ends of relay rod 22 are operably coupled to tie rods 24 with ball joints 26. Ball joints 26 allow for 360 degrees of rotation about horizontal axes 28 that extend substantially parallel with the longitudinal axis or centerline 30 of the vehicle in which steering unit assembly 20 is mounted.

Steering unit assembly 20 includes two steering gears 32 which provide a power assist to the steering wheel of the vehicle. Steering gears 32 have a hydraulically driven output shaft that is driven in response to a rotational input from the steering wheel of the vehicle. The illustrated steering gears 32 are conventional hydraulically powered steering gears that operate in a manner well-known to those having ordinary skill in the art. While the illustrated steering gears 32 are hydraulically powered, alternative embodiments could alternatively employ electrically powered steering gears or other forms of power assist or torque transfer devices.

Each of the steering gears 32 have an output shaft 34 that is connected with relay rod 22 with a connecting rod 36. In the illustrated embodiment, output shafts 34 define vertical rotational axes 35. Connecting rods 36 are secured at one end to output shafts 34 and rotate along with output shafts 34. The opposite ends of connecting rods 36 are secured to relay rod 22 with ball joints 38. Connecting rods 36 are pivotally coupled with the vehicle chassis via output shafts 34 and steering gears 32 and thereby act as support arms for relay rod 22. Connecting rods 36 are also referred to herein as Pitman arms and/or Pitman rods because rods 36 are secured to a rotating shaft at one end and a translating member at their opposite ends. The ball joints 38 coupling connecting rods 36 with relay rod 22 are positioned transversely between ball joints 26. The movement of output shaft 34 is thereby transmitted by connecting rods 36 resulting in the transverse displacement of relay rod 22. Ball joints 38 are oriented so that they allow 360 degrees of rotation about substantially parallel vertical axes 40. As best understood with reference to FIGS. 2 and 3, vertical rotational axes 40 of ball joints 38 and horizontal rotational axes 28 of ball joints 26 are thereby oriented at a 90 degree angle relative to each other. As will be understood by those having ordinary skill in the art, ball joints typically define a primary axis about which 360 degrees of rotation is permitted and also allow pivotal movement about other axes although rotational movement about axes other than the primary axis is often limited to less than 360 degrees.

Steering gears 32 are secured to the vehicle chassis 44 and output shafts 34 are rotated in cooperation as steering gears 32 each receive input from the steering wheel (not shown). As output shafts 34 rotate Pitman arms 36, relay rod 22 is moved laterally. As relay rod 22 is moved laterally, tie rods 24 are also moved laterally. Each of the tie rods 24 is connected with a steering knuckle 46 by a ball joint 42. Tie rods 24 thereby simultaneously rotate steering knuckles 46 about king pin 48 to steer the wheels supported on the steering knuckles 46. In the illustrated embodiments, ball joints 42 are oriented such that they allow for 360 degrees of rotation about the substantially vertical axes 49 of king pins 48. Knuckle axes 49 is best seen in FIG. 11 and is positioned at a substantially, but not precisely, vertical orientation. If greater vertical movement of steering knuckles 46 is desired, ball joints 42 can be re-oriented. (Steering knuckles 46 and king pins 48 can be seen in FIGS. 9-14 which illustrate alternative steering unit assemblies.)

The use of a rigid transversely extending relay rod 22 to tie together the movement of tie rods 24 provides steering unit assembly 20 with favorable performance characteristics. As can be seen in FIGS. 1-3, the ball joints 38 connecting steering gears 32 to relay rod 22 via connecting rods 36 are located inboard of the ball joints 26 which connect relay rod 22 to tie rods 24. Moreover, each of the four ball joints 26, 38 joining the relay rod 22 with tie rods 24 and connecting rods 36 lie along a common line 50. Aligning ball joints 26, 38 in such a linear arrangement inhibits the binding of relay rod 22.

FIGS. 4-6 illustrate the installation of steering gears 32 on vehicle chassis 44. Vehicle chassis 44 is a front chassis for a large truck. Chassis 44 has a "cradle" like form which includes a central void for receiving a large engine. Dashed lines 52 (FIG. 5) indicate the central void area within chassis 44 where the engine is located. Chassis 44 includes side assemblies 54 located on opposite lateral sides of engine 52. Chassis 44 includes a tubular cross member 56 that extends between the upper ends of side assemblies 54. Two lower cross member assemblies 58 extend between side chassis assemblies 54 below engine 52. Each of the lower cross member assemblies 58 include a structural cross member 60 which, in the illustrated embodiment, takes the form of a tubular member having a slight bend. Mounting brackets 62 are secured to the opposite ends of cross member 60 and are secured with threaded fasteners 64, e.g., nut and bolt assemblies. Cross members 56, 58 are structural and provide lateral strength to chassis 44.

By using threaded fasteners 64 to secure the lower cross member assemblies 58 to side chassis assemblies 54, the detachable cross member assemblies 58 can be easily removed to service engine 52. For example, in many large trucks, the engine must be slightly elevated relative to the chassis when changing the oil. By attaching cross member assemblies 58 with threaded fasteners that can be easily removed for servicing engine 52, the servicing of engine 52 can be accomplished in a more convenient manner. As can be seen in FIG. 5, brackets 62 engage side assemblies 54 on surfaces that are inwardly slanted in a generally V-shaped configuration. This orientation of the mounting surfaces allows cross member assembly 58 to be supported on side chassis assemblies 54 when fasteners 64 are removed. This, in turn, allows the cross member assemblies 58 to be more easily attached and detached from chassis 44. In other words, when cross member assemblies 58 are installed and in their secured position, threaded fasteners 64 can be removed and cross member assemblies 58 will remain in place supported on chassis 44. This is useful both when removing the assemblies 58 and also when re-attaching the assemblies 58.

As can be seen in FIG. 4, a side mounting bracket 66 and a lower mounting bracket 68 are used when securing steering gears 32 to side chassis assemblies 54. Mounting brackets 66, 68 are secured using threaded fasteners 70 or other suitable means. Lower mounting bracket 68 includes an opening 72 through which the output shaft 34 of steering gear 32 extends.

Figure 16:
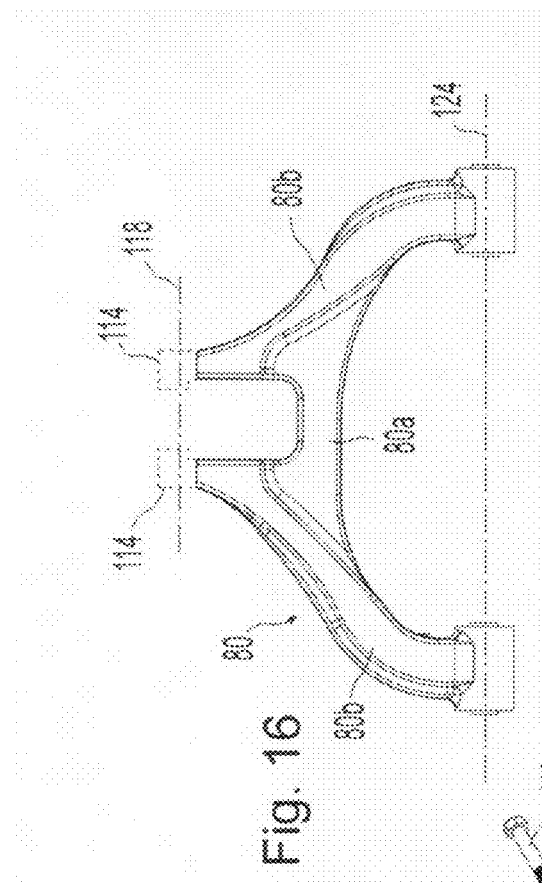
FIG. 16 is a top view of a lower control arm.
Figure 17:
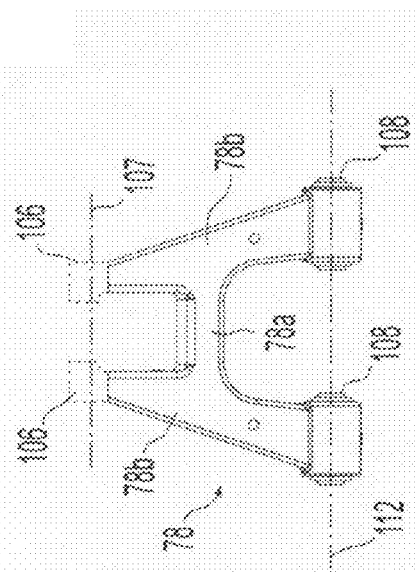
FIG. 17 is a top view of an upper control arm.
Figure 15:
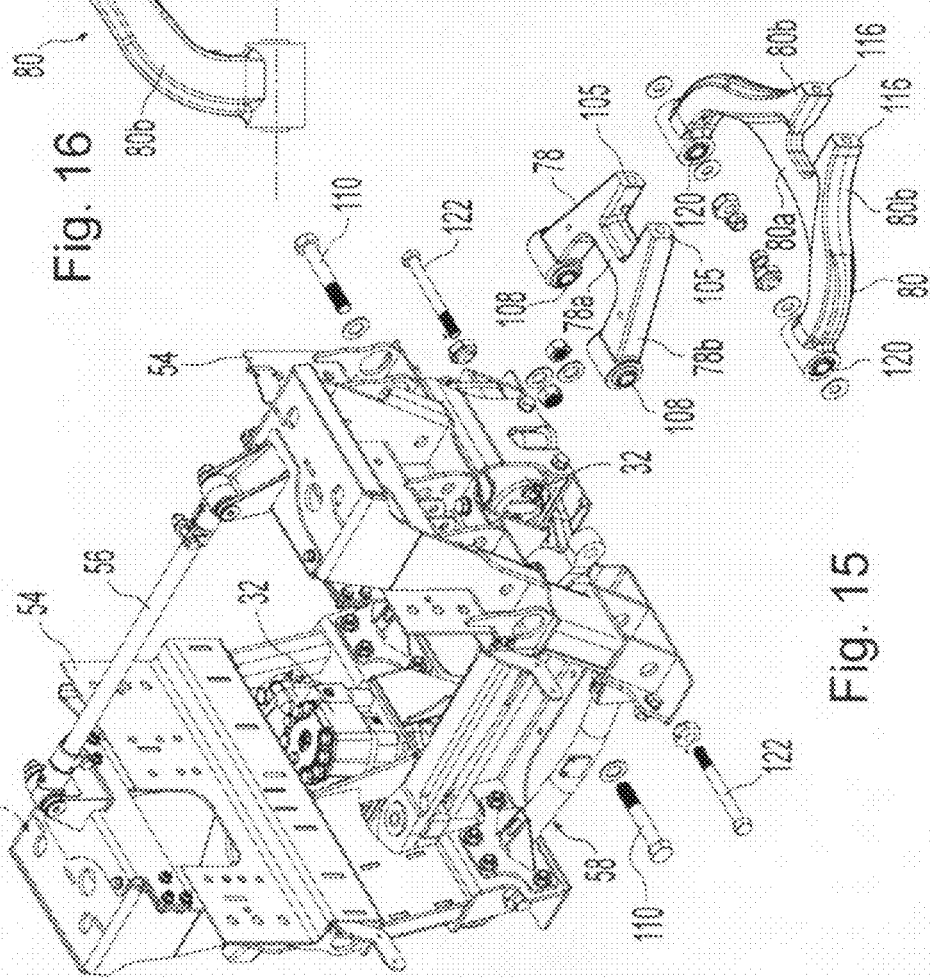
FIG. 15 is a partially exploded perspective view showing the attachment of an upper and a lower control arm on the chassis.

FIG. 7 illustrates the front chassis 44 with steering unit assembly 20 mounted thereon along with the steering knuckles 46 and wheel hub assemblies 74. Wheel hub assemblies 74 are rotatably mounted on spindles 76 (see FIGS. 9-14) which extend outwardly from steering knuckles 46. As discussed in greater detail below, the steering knuckles 46 and wheel hub assemblies 74 are supported on knuckle carriers 126 that are moveable in a vertical direction. Two separate pairs of pivotal upper and lower control arms 78, 80 (FIGS. 15-17) maintain spindles 76 in generally horizontal orientation as steering knuckles 46 independently move in a vertical direction in response to irregularities in the road surface.

Before discussing the operation of the independent suspension system in detail, two alternative steering units that can be used with the independent suspension system will be discussed. The steering unit assembly 20A illustrated in FIGS. 9-11 is generally similar to steering unit 20. Unlike steering unit 20, steering unit 20A includes only a single steering gear 32. A connecting rod 36 connects the output shaft 34 of steering gear 32 to relay rod 21. To maintain the proper alignment of relay rod 21 as relay rod 21 is moved by steering gear 32, an idler arm 82 is pivotally mounted on chassis 44 with pivot joint 84. Ball joints 37 secure connecting rod 36 and idler arm 82 to relay rod 21. Ball joints 27 secure the outer ends of relay rod 21 to tie rods 24. Relay rod 21 differs from relay rod 22 and has a simplified structure. Similar to steering unit assembly 20, each of the four ball joints 37, 27 associated with relay rod 21 lie in a line 51. However, unlike steering unit assembly, each of the four ball joints 27, 37 provide for 360 degree rotation about vertical axes 29, 39.

The steering unit assembly 20B illustrated in FIGS. 12-14 is generally similar to steering unit 20A. Like steering unit 20A, steering unit 20B uses a single steering gear 32 and an idler arm 82. Steering unit 20B differs from Steering unit 20A only in how steering gear 32 is connected with relay rod 21. Instead of directly connecting steering gear 32 with relay rod 21 via a single connecting rod 36, a linkage assembly 86 is disposed between the steering gear 32 and relay rod 21. Linkage assembly 86 includes a lever arm 88 connected to the output shaft 34 of steering gear 32 at connection 90. An intermediate rod 92 is pivotally connected to lever arm 88 at pivot joint 94. Another pivot joint 96 connects intermediate rod 92 to an L-shaped bell crank 98. Bell crank 98 is mounted on chassis 44 at opening 100 and pivots about a pivot joint mounted within opening 100. Bell crank 98 is also secured to relay rod 21 via a ball joint 37. Thus, as best seen in FIG. 13, when steering gear 32 rotates lever arm 88, intermediate rod 92 will pivot bell crank 98 about opening 100 and thereby move relay rod 21 due to the ball joint 37 which connects bell crank 98 with relay rod 21.

The independent suspension system 102 includes two separate independent suspension assemblies 104 for mounting a paired set of wheels on the vehicle. The two wheels (not shown) mounted on the illustrated suspension assemblies 104 are the front steerable wheels of the vehicle and are located on opposite sides of the longitudinal centerline 30 of the vehicle. The illustrated independent suspension system 102 is adapted to be mounted on a truck or other vehicle chassis which includes a pair of side chassis assemblies 54 but may also be used with vehicles having alternative chassis configurations. Similarly, while the illustrated embodiment employs independent suspension assemblies 104 with the front, steerable wheels of the vehicle, similar independent suspension assemblies could also be employed with rear steerable or non-steerable wheels of the vehicle.

Figure 21:
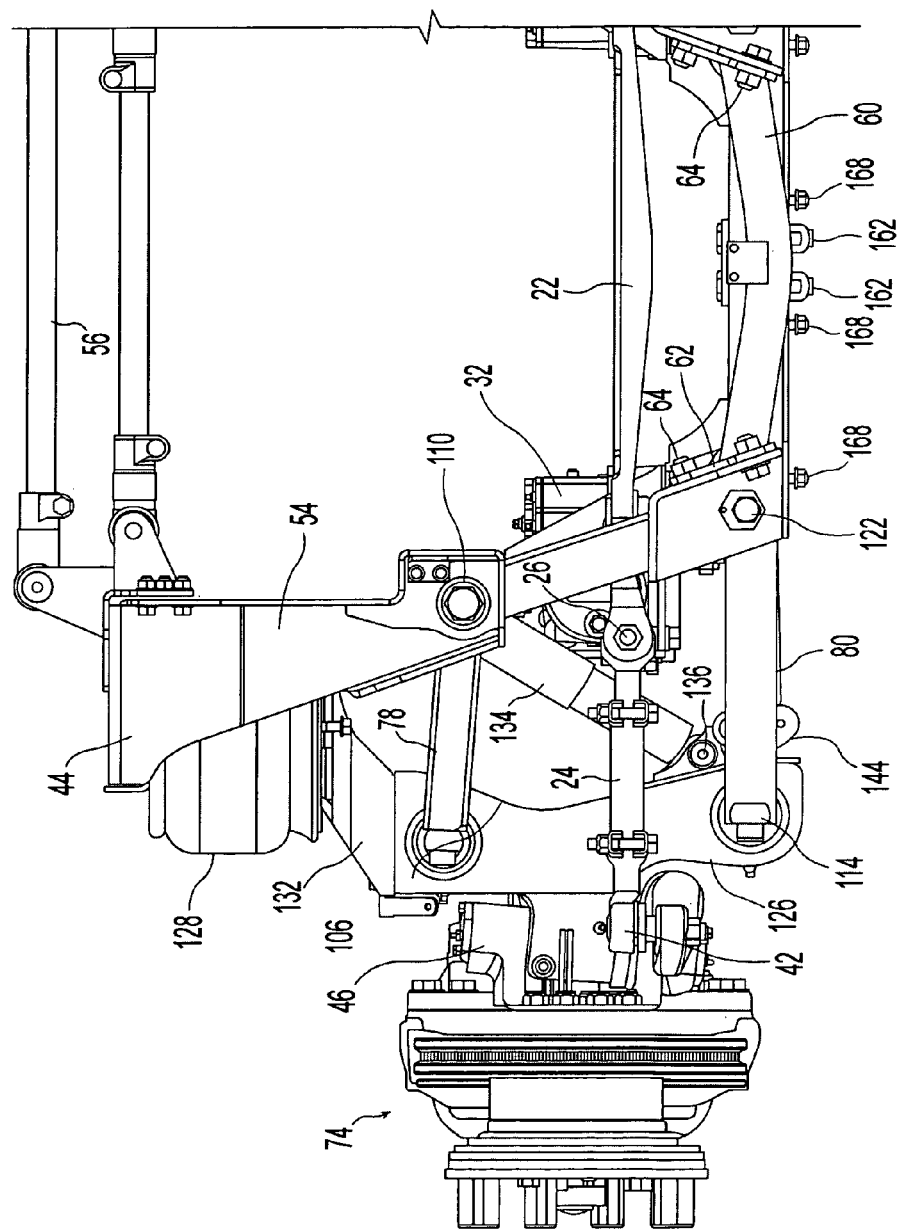
FIG. 21 is a front view of one side of the suspension and steering assembly.
Figure 22:
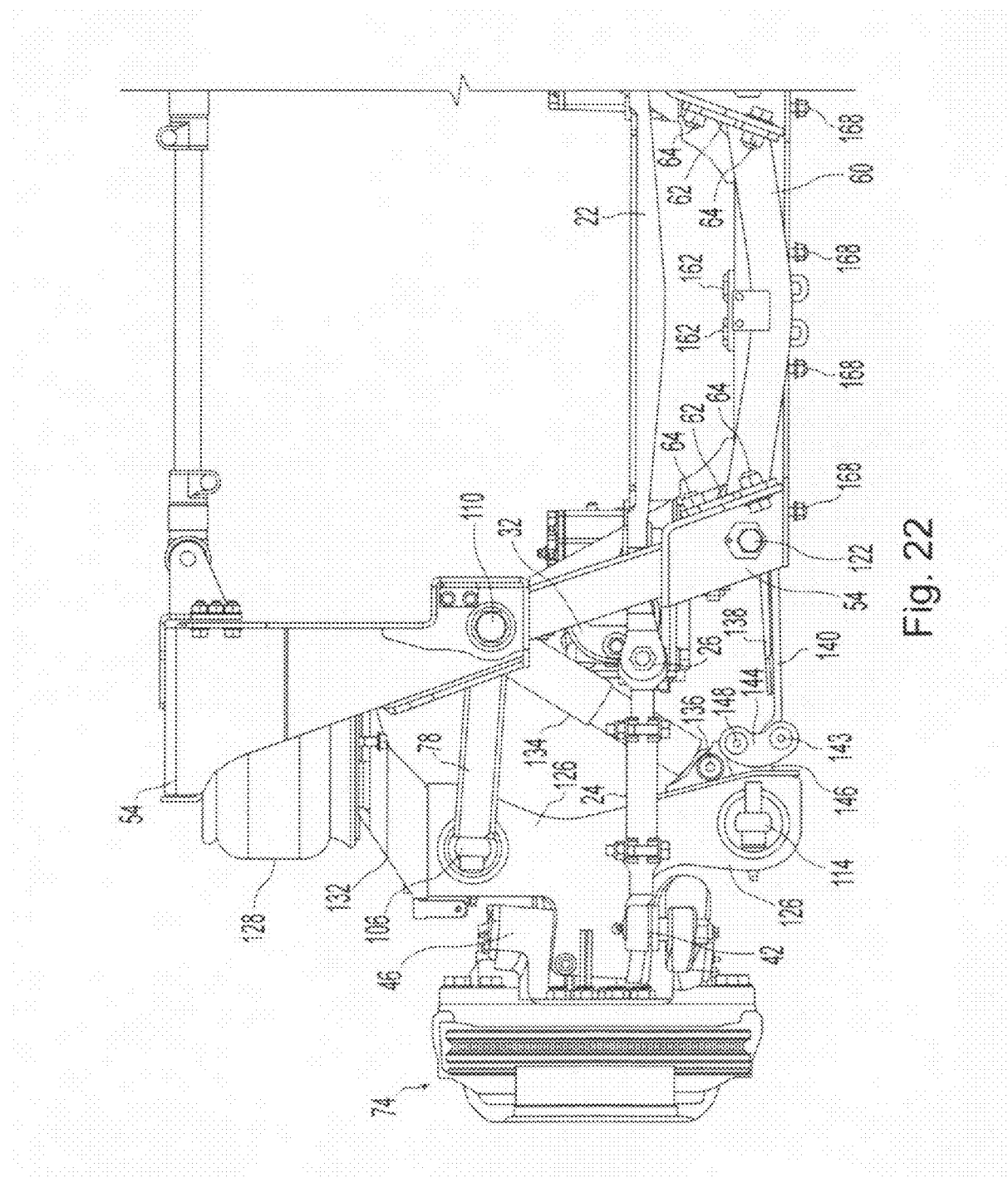
FIG. 22 is a front view of one side of the suspension and steering assembly with the lower control arm removed.
Figure 23:
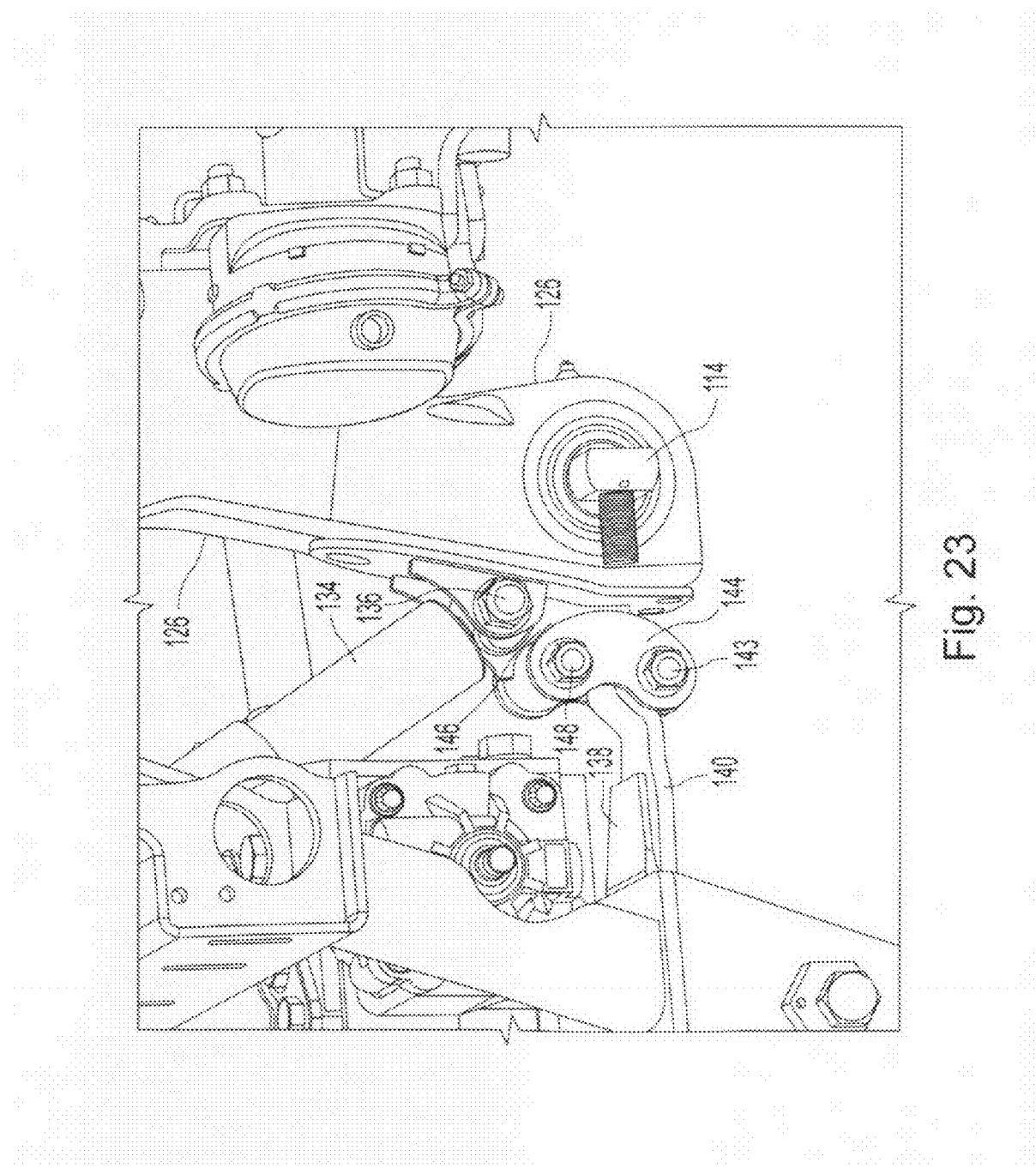
FIG. 23 is a perspective view showing the attachment of the leaf spring to the knuckle carrier.

As mentioned above, the front wheels of the vehicle are supported on steering knuckles 46. Spindles 76 located on knuckles 46 supports wheel hub assemblies 74 which, in turn, support a pair of transversely spaced wheels in a customary manner. Wheel hub assemblies 74 have a conventional construction and include a brake drum, brake actuator and lug nuts for mounting the wheel. King pins 48 rotatably mount steering knuckles 46 on knuckle carriers 126 as best understood with reference to FIGS. 21 and 22.

As discussed below, knuckle carriers 126 are secured to chassis 44 with upper and lower control arms 78, 80. The upper and lower control arms 78, 80 form a parallelogram structure with chassis 40 and each of the knuckle carriers 126. As a result, knuckle carriers 126 move vertically relative to chassis 44 while maintaining a substantially constant orientation relative to the chassis 44 and ground surface. In other words, as knuckle carrier 126 moves vertically, king pin 48 mounted thereon is maintained at a substantially constant orientation relative to the ground surface. Because steering knuckle 46 is rotatably mounted on the king pin 48 and thereby the carrier 126, steering knuckle 46 and the steerable wheel mounted thereon are also vertically moveable relative to chassis 44. King pin 48 allows steering knuckle 46 to rotate relative to knuckle carrier 126 to thereby allow for steering movement of the wheel mounted on steering knuckle 46 as the steering knuckles 46 are selectively rotated about king pins 48 by tie rods 24.

Turning now to FIGS. 15-18, the knuckle carriers 126 are pivotally attached at their upper ends to an upper control arm 78 with pivot joints 106. The illustrated upper control arms 78 are H-shaped with a cross member 78*a* joining the two limbs 78*b* of upper control arm 78. Pivot joints 106 are secured to distal ends 105 of limbs 78*b* of upper control arm 78. Pivot joints 106 allow the knuckle carriers 126 to rotate about a longitudinally extending axis 107. The upper control arms 78 are pivotally attached, opposite knuckle carriers 126, to side chassis assemblies 54. Bushings 108 and bolts 110 pivotally secure upper control arms 46 to chassis 44 and define a longitudinally extending axis 112 about which upper control arms 78 pivot relative to chassis 44. Axes 107 and 112 are parallel with each other and substantially parallel with longitudinal axis 30. Relative pivotal movement between upper control arm 78 and steering knuckle 46 about longitudinally extending axis 107 at pivot joint 106 and between upper control arm 78 and chassis 44 about longitudinally extending axis 112 allows knuckle carrier 126 to move vertically up and down.

The knuckle carriers 126 are pivotally attached at their lower ends to lower control arms 80 with pivot joints 114. The illustrated lower control arms 80 are H-shaped with a cross member 80*a* joining the two limbs 80*b* of lower control arm 80. Pivot joints 114 are secured to distal ends 116 of limbs 80*b* of lower control arm 80. Pivot joints 114 allow the knuckle carriers 126 to pivot about a longitudinally extending axis 118. The lower control arms 80 are pivotally attached, opposite knuckle carriers 126, to side chassis assemblies 54. Bushings 120 and bolts 122 pivotally secure lower control arms 80 to chassis 44 and define a longitudinally extending axis 124 about which lower control arms 80 pivot relative to chassis 44. Relative pivotal movement between lower control arm 80 and knuckle carrier 126 about longitudinally extending axis 118 at pivot joints 114 and between lower control arm 80 and chassis 44 about longitudinally extending axis 124 allow knuckle carriers 126 to move vertically up and down. Axes 118 and 124 are parallel with each other and axes 107 and 112 and control arms 78, 80 thereby form a parallelogram structure. In the illustrated embodiment, all four of these axes are substantially parallel with longitudinally extending vehicle centerline 30. The parallelogram structure formed by upper and lower control arms 78, 80 maintain knuckle carriers 126 in an upright orientation.

Thus, steering knuckles 46 are vertically displaceable relative to the vehicle chassis 44 by the pivotal movement of upper and lower control arms 78, 80 and vertical movement of knuckle carrier 126 on which steering knuckles 46 are mounted. Steering knuckles 46 are pivotal about king pins 48 to provide for steering rotation of the wheels mounted on spindles 76. Ball joints 26, 42 on the opposite ends of tie rods 24 allow for the relative vertical movement of steering knuckles 46 and relay rod 20 and the pivotal movement of steering knuckles 46 about king pins 48.

The suspension system includes air springs 128, leaf spring assembly 130 and shock absorbers 134. Vertical loads from the steerable wheels mounted on spindles 76 are transferred to steering knuckles 46 and then to knuckle carriers 126 in a customary manner. Loads are then transferred to chassis 44 and dampened by air springs 128, leaf spring assembly 130 and shock absorbers 134.

Turning first to air springs 128, the lower end of air springs 128 are secured to mounting brackets 132 while the upper end of air springs 128 are secured to side chassis assemblies 54. Mounting brackets 132 are secured to the upper end of knuckle carriers 126 and, thus, air springs 128 transfer vertical forces between knuckle carriers 126 and chassis 44 as can be readily understood with reference to FIGS. 18, 21 and 22. The illustrated embodiment utilizes conventional air springs 128.

Conventional telescoping shock absorbers 134 are also employed in the illustrated suspension system to transfer loads between knuckle carriers 126 and chassis 44. As best understood with reference to FIGS. 21-24, a conventional shock absorber 134 is secured to each of the knuckle carriers 126 and to the chassis 44 with pivotal joints 136.

Leaf spring assembly 130 is shown in an exploded view in FIG. 18 and extends between the two knuckle carriers 126. The illustrated leaf spring assembly 130 includes an upper leaf spring member 138 and a lower leaf spring member 140. Alternative embodiments, however, may utilize either a single leaf spring member or a greater number of leaf spring members. Opposing ends 139 of leaf springs 138, 140 are vertically displaceable relative to the transverse midpoint of leaf spring assembly 130 which is fixed relative to chassis 44.

Bushings 142 are secured to the opposite ends 139 of lower leaf spring member 140 and pivot bolts 143 pivotally secure leaf spring member 140 to shackle 144. Shackle 144 is, in turn, pivotally mounted with a pivot bolt 148 to a shackle bracket 146 secured on knuckle carrier 126. Thus, the opposite ends 139 of leaf springs 138, 140 are pivotally secured to a shackle 144 which is itself pivotally secured to knuckle carrier 126. Pivot bolts 143 and 148 define pivot axes 145 and 147 respectively. As can be seen in FIG. 19, axes 145 and 147 are parallel with each other and spaced apart. Axes 145 and 147 are also substantially parallel with longitudinal centerline 30.

In the illustrated embodiment, each of the knuckle carriers 126 are pivotally coupled with upper and lower control arms 78, 80 and shackle members 144 which are each, in turn, pivotally coupled with chassis 44. In this regard, it is noted that shackles 144 are pivotally coupled to leaf spring assembly 130 which, in turn, is fixed to chassis 44. As reflected by the nomenclature, upper control arms 78 are secured to knuckle carriers 126 on the upper regions of knuckle carriers 126 while the lower control arms 80 as well as shackles 44 are secured to knuckle carriers 126 on the lower regions of knuckle carriers 126. As a result, the upper control arm 78 and its pivot axes 107, 112 for each knuckle carrier 126 is disposed at a higher vertical position than both lower control arm 80 and its pivot axes 118, 124 as well as shackles 144 and its pivot axes 147, 145. In this illustrated embodiment, it is the control arms 78, 80 which together with chassis 44 and knuckle carriers 126 and the pivotal connections therebetween that form a parallelogram structure that maintains knuckle carriers 126 in a substantially upright orientation as knuckle carriers 126 move vertically relative to chassis 44. In this arrangement with two control arms, shackle members 144 merely couple knuckle carriers 126 with leaf spring assembly 130 to thereby dampen the vertical movement of knuckle carriers 126. It is envisioned, however, that lower control arms 80 could be omitted for some applications and that the pivotal connections between the knuckle carriers 126 and the upper control arm 78 and shackle 44 would be sufficient to maintain the knuckle carriers 126 in a substantially upright orientation.

Figure 24:
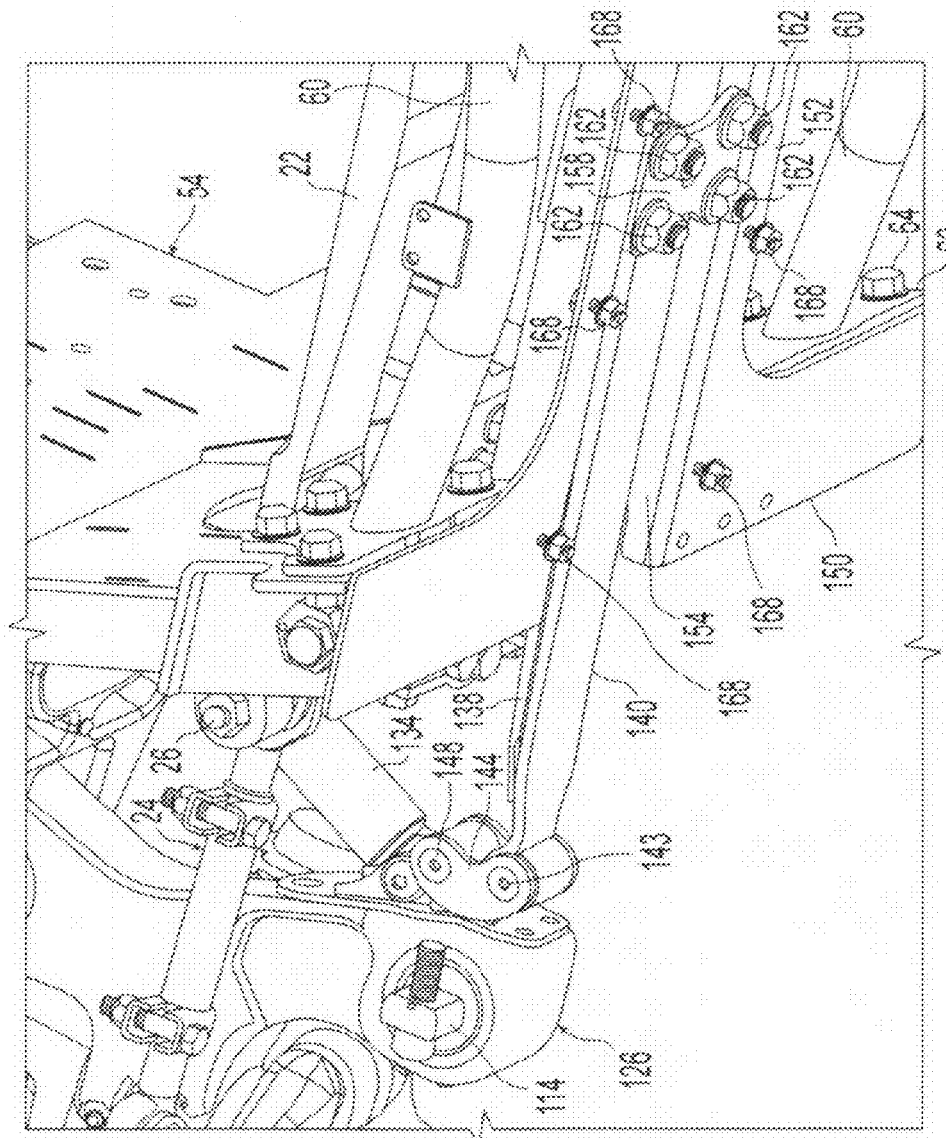
FIG. 24 is a perspective view showing the attachment of the leaf spring to the chassis and to one of the knuckle carriers.
Figure 25:
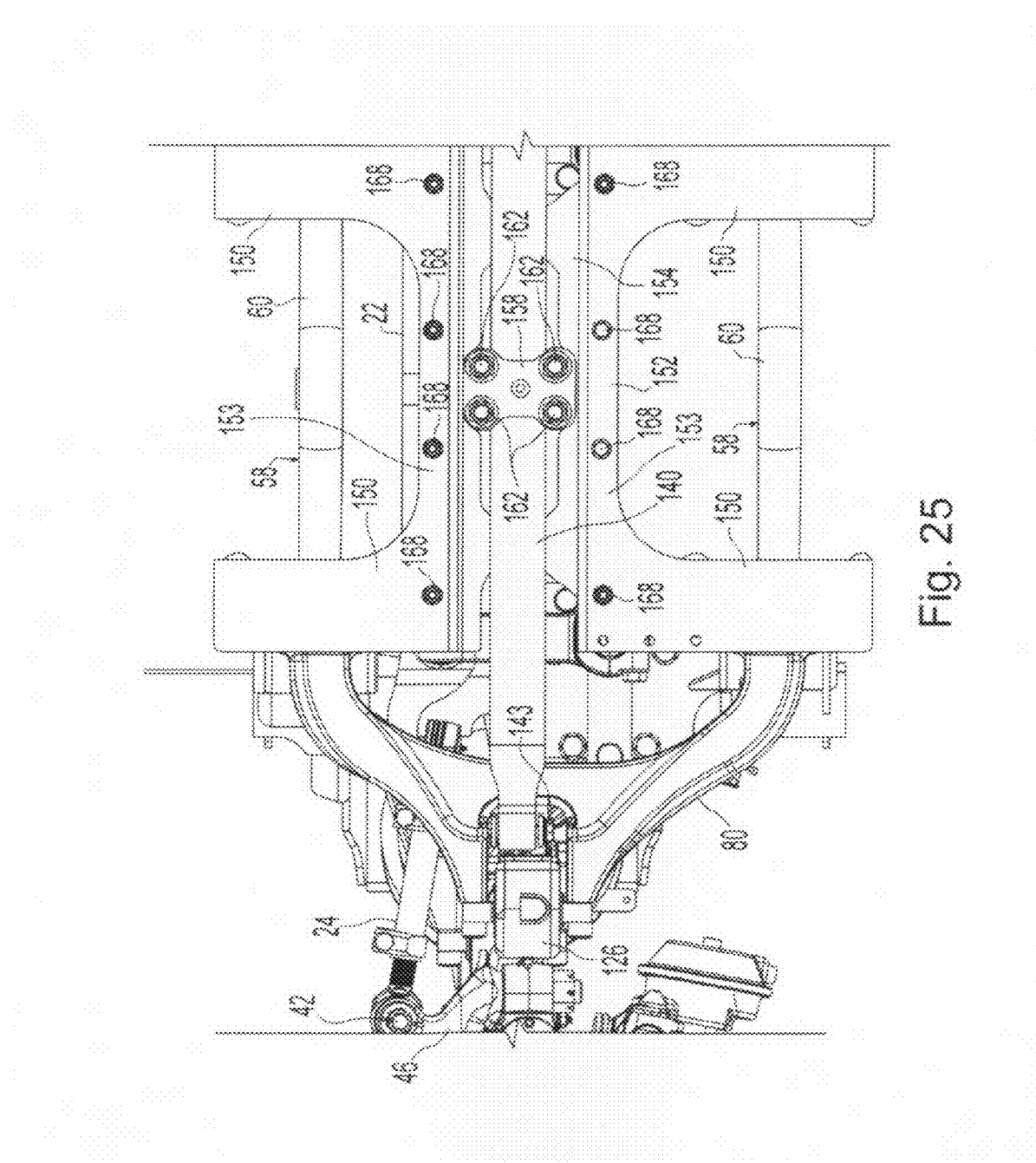
FIG. 25 is a bottom view of the chassis and suspension system with the lower leaf spring cover plate removed.

A generally H-shaped metal plate 150 (FIG. 25) is secured to the bottom of side chassis assemblies 54 with the central web 152 of plate 150 extending laterally between the two opposing side chassis assemblies 54. Central web 152 forms a downwardly opening channel 154 through which leaf spring members 138, 140 extend. Leaf spring members 138, 140 are secured to chassis 44 at their transverse midpoint within channel 154 proximate the vehicle centerline 30 as best seen in FIGS. 20, 24 and 25. Engagement plates 156, 158 are located on the top and bottom of leaf spring members 138, 140 at the midpoint of the leaf spring assembly and secure leaf springs 138, 140 therebetween. As can be seen in FIG. 20, a spacer plate 160 is positioned between upper engagement plate 156 and metal plate 150 at the midpoint of leaf springs 138, 140. Spacer member 160 positions leaf springs 138, 140 at a distance from metal plate 150 and allows leaf springs 138, 140 to flex within channel 154. Fasteners 162, which take the form of a threaded nut and bolt assembly in the illustrated embodiment, extend through metal plate 150 and engagement plates 156, 158 and tightly secure leaf springs 138, 140 together and to chassis 44 at the midpoint of leaf springs 138, 140.

A cover plate 164 (FIG. 18) is attached to the bottom side of metal plate 150 and provides some protection to leaf springs 138, 140 from road debris. Cover plate 164 is spaced away from leaf springs 138, 140 near the midpoint of leaf springs 138, 140 and includes cutouts 166 at its opposite lateral ends to permit the free flexing of leaf springs 138, 140. Cover plate 164 also includes access openings 167 to provide access to fasteners 162. Channel member 154 formed by bottom plate 150 includes outwardly extending flanges 153 disposed on opposite sides of the channel member 154. Cover plate 164 is attached to flanges 153 with fasteners 168. Cover plate 164 is not shown in FIGS. 21, 22, 24 and 25 so that leaf spring assembly 130 may be more clearly depicted.

While this invention has been described as having an exemplary design, the present invention may be further modified within the spirit and scope of this disclosure. This application is therefore intended to cover any variations, uses, or adaptations of the invention using its general principles.

What is claimed is:

1. An independent suspension system for a pair of steerable wheels, said independent suspension system comprising:
   a vehicle chassis defining a longitudinally extending vehicle centerline;
   a transversely extending leaf spring assembly, said leaf spring assembly being fixedly secured proximate a transverse midpoint of said leaf spring assembly to said chassis proximate said vehicle centerline, said leaf spring assembly including opposing ends, each of said opposing ends being vertically displaceable relative to said transverse midpoint;
   a pair of knuckle carriers having upper and lower ends, each of said knuckle carriers being relatively vertically moveably mounted on said chassis, each of said opposing ends of said leaf spring assembly being pivotally coupled with a respective one of said knuckle carriers whereby vertical movement of said knuckle carriers is dampened;
   a pair of steering knuckles adapted to have the steerable wheels mounted thereon, each of said steering knuckles being pivotally supported on a respective one of said knuckle carriers; and,
   further comprising a pair of air springs wherein one of said air springs is disposed between each of said knuckle carriers and said chassis.

2. An independent suspension system for a pair of steerable wheels, said independent suspension system comprising:
   a vehicle chassis defining a longitudinally extending vehicle centerline;
   a transversely extending leaf spring assembly, said leaf spring assembly being fixedly secured proximate a transverse midpoint of said leaf spring assembly to said chassis proximate said vehicle centerline, said leaf spring assembly including opposing ends, each of said opposing ends being vertically displaceable relative to said transverse midpoint;
   a pair of knuckle carriers having upper and lower ends, each of said knuckle carriers being relatively vertically moveably mounted on said chassis, each of said opposing ends of said leaf spring assembly being pivotally coupled with a respective one of said knuckle carriers whereby vertical movement of said knuckle carriers is dampened;
   a pair of steering knuckles adapted to have the steerable wheels mounted thereon, each of said steering knuckles being pivotally supported on a respective one of said knuckle carriers; and,
   wherein said chassis comprises a pair of side assemblies and lower chassis member extending between said side assemblies, said lower chassis member defining a transversely extending downwardly opening channel member, said leaf spring member extending within said channel member and secured thereto proximate said transverse midpoint of said leaf spring assembly.

3. The independent suspension system of claim 2 wherein said lower chassis member is detachably secured to said side assemblies with threaded fasteners.

4. The independent suspension system of claim 2 further comprising a cover plate secured to said channel member wherein said leaf spring member extends between said channnel member and said cover plate.

5. The independent suspension system of claim 4 wherein said downwardly opening channel member includes a pair of outwardly extending flanges disposed on opposite sides of said channel member and said cover plate is secured to said outwardly extending flanges.

6. The independent suspension system of claim 4 wherein said cover plate defines at least one access opening proximate said vehicle centerline, said access opening adapted to allow access to said transverse midpoint of said leaf spring assembly secured to said chassis.

7. The independent suspension system of claim 4 further comprises a spacer member disposed between said leaf spring assembly and said channel member proximate said transverse midpoint of said leaf spring assembly.

8. The independent suspension system of claim 7 further comprising upper and lower engagement plates respectively disposed adjacently above and below said leaf spring assembly proximate said transverse midpoint of said leaf spring assembly, said leaf spring assembly being secured to said channel member with threaded fasteners extending through said upper and lower engagement plates and securely clamping said leaf spring assembly between said upper and lower engagement plates.

9. The independent suspension system of claim 8 wherein said threaded fasteners extending through said engagement plates also extend through said spacer member and said channel member.

10. The independent suspension system of claim 9 wherein said downwardly opening channel member includes a pair of outwardly extending flanges disposed on opposite sides of said channel member and said cover plate is secured to said outwardly extending flanges.

11. The independent suspension system of claim 10 wherein said cover plate defines at least one access opening adapted to allow access to said threaded fasteners extending through said engagement plates.

12. An independent suspension system for a pair of steerable wheels, said independent suspension system comprising:
   a vehicle chassis defining a longitudinally extending vehicle centerline;
   a transversely extending leaf spring assembly, said leaf spring assembly being fixedly secured proximate a transverse midpoint of said leaf spring assembly to said chassis proximate said vehicle centerline, said leaf spring assembly including opposing ends, each of said opposing ends being vertically displaceable relative to said transverse midpoint;
   a pair of knuckle carriers having upper and lower ends, each of said knuckle carriers being relatively vertically moveably mounted on said chassis, each of said opposing ends of said leaf spring assembly being pivotally coupled with a respective one of said knuckle carriers whereby vertical movement of said knuckle carriers is dampened;
   a pair of steering knuckles adapted to have the steerable wheels mounted thereon, each of said steering knuckles being pivotally supported on a respective one of said knuckle carriers;
   wherein said chassis comprises a pair of side assemblies, at least one upper cross member and at least one lower cross member, each of said upper and lower cross members extending between said side assemblies whereby said chassis defines a central void adapted to receive an engine; and
   wherein said at least one lower cross member is detachably secured to said side assemblies.

13. The independent suspension system of claim 12 wherein said at least one lower cross member is secured to said side assemblies with threaded fasteners.

14. The independent suspension system of claim 13 wherein said at least one lower cross member defines a secured position when said threaded fasteners are securing said at least one lower cross member to said chassis and said at least one lower cross member is supportable on said chassis in said secured position when said threaded fasteners are removed.

15. The independent suspension system of claim 14 wherein said chassis further comprises a lower chassis member extending between said side assemblies, said lower chassis member defining a transversely extending substantially C-shaped downwardly opening channel member, said leaf spring member extending within said channel member and secured thereto proximate said transverse midpoint of said leaf spring assembly and wherein said lower chassis member is detachably secured to said side assemblies with second threaded fasteners.

16. The independent suspension system of claim 15 further comprising a pair of shackle members respectively connecting said opposing ends of said leaf spring assembly to said knuckle carriers; each of said shackle members being coupled to one of said opposing ends at a first pivotal joint and coupled to one of said knuckle carriers at a second pivotal joint, wherein said first and second pivotal joints of each said shackle member define substantially parallel pivot axes.

17. The independent suspension system of claim 16 wherein each of said knuckle carriers is secured to said chassis with an upper control arm and a lower control arm, each of said upper and lower control arms being pivotally secured to said chassis and pivotally secured to a respective one of said knuckle carriers and defining pivot axes substantially parallel with said vehicle centerline.

18. The independent suspension system of claim 17 further comprising a pair of air springs wherein one of said air springs is disposed between each of said knuckle carriers and said chassis.

19. An independent suspension system for a pair of steerable wheels, said independent suspension system comprising:
   a vehicle chassis defining a longitudinally extending vehicle centerline;
   a transversely extending leaf spring assembly, said leaf spring assembly being fixedly secured to said chassis and including opposing ends, each of said opposing ends being vertically displaceable relative to said chassis;
   a pair of knuckle carriers, each of said knuckle carriers being relatively vertically moveably mounted on said chassis;
   a pair of shackles wherein each of said shackles is pivotally coupled to one of said opposing ends of said leaf spring assembly with a first pivotal joint and is pivotally coupled to a respective one of said knuckle carriers with a second pivotal joint and wherein, on each of said shackles, said first and second pivotal joints define spaced apart pivot axes; and
   a pair of steering knuckles adapted to have the steerable wheels mounted thereon, each of said steering knuckles being pivotally supported on a respective one of said knuckle carriers; and,
   further comprising a pair of air springs wherein one of said air springs is disposed between each of said knuckle carriers and said chassis.

20. The independent suspension system of claim 19 wherein said pivot axes defined by each of said first and second pivotal joints are disposed substantially parallel with said vehicle centerline.

21. The independent suspension system of claim 19 wherein said leaf spring assembly is fixedly secured to said chassis proximate a transverse midpoint of said leaf spring assembly.

22. An independent suspension system for a pair of steerable wheels, said independent suspension system comprising:
   a vehicle chassis defining a longitudinally extending vehicle centerline;
   a transversely extending leaf spring assembly, said leaf spring assembly being fixedly secured to said chassis and including opposing ends, each of said opposing ends being vertically displaceable relative to said chassis;
   a pair of knuckle carriers, each of said knuckle carriers being relatively vertically moveably mounted on said chassis;
   a pair of shackles wherein each of said shackles is pivotally coupled to one of said opposing ends of said leaf spring assembly with a first pivotal joint and is pivotally coupled to a respective one of said knuckle carriers with a second pivotal joint and wherein, on each of said shackles, said first and second pivotal joints define spaced apart pivot axes;

a pair of steering knuckles adapted to have the steerable wheels mounted thereon, each of said steering knuckles being pivotally supported on a respective one of said knuckle carriers; and, further comprising a pair of first control arms, each of said first control arms being pivotally mounted on said chassis and pivotally secured to a respective one of said knuckle carriers wherein pivot axes defined by said first control arms are disposed substantially parallel with said first and second pivot axes defined by a respective one of said shackles.

23. The independent suspension system of claim 22 further comprising a pair of second control arms, each of said second control arms being pivotally mounted on said chassis and pivotally secured to a respective one of said knuckle carriers wherein pivot axes defined by said second control arms are disposed substantially parallel with said pivot axes defined by said first control arms.

24. An independent suspension system for a pair of steerable wheels, said independent suspension system comprising:
- a vehicle chassis defining a longitudinally extending vehicle centerline;
- a transversely extending leaf spring assembly, said leaf spring assembly being fixedly secured to said chassis and including opposing ends, each of said opposing ends being vertically displaceable relative to said chassis;
- a pair of control arms, each of said control arms being pivotally mounted to said chassis and thereby defining a pair of first pivot axes;
- a pair of knuckle carriers, each of said knuckle carriers being pivotally coupled to one of said control arms thereby defining a pair of second pivot axes and pivotally coupled to one of said opposing ends of said leaf spring assembly thereby defining a pair of third pivot axes and wherein, for each of said knuckle carriers, said first, second and third pivot axes are disposed substantially parallel and said knuckle carrier is vertically moveable relative to said chassis; and
- a pair of steering knuckles adapted to have the steerable wheels mounted thereon, each of said steering knuckles being pivotally supported on a respective one of said knuckle carriers.

25. The independent suspension system of claim 24 wherein, for each of said knuckle carriers, said second pivot axis is positioned at a higher vertical position than said third pivot axis.

26. The independent suspension system of claim 25 further comprising a pair of second control arms, each of said second control arms being pivotally mounted to said chassis and thereby defining a pair of fourth pivot axes and each of said knuckle carriers being pivotally coupled to one of said second control arms thereby defining a pair of fifth pivot axes and wherein, for each of said knuckle carriers, said second pivot axis is positioned at a higher vertical position than said fifth pivot axis.

27. The independent suspension system of claim 25 wherein said chassis comprises a pair of side assemblies, at least one upper cross member and at least one lower cross member, each of said upper and lower cross members extending between said side assemblies whereby said chassis defines a central void adapted to receive an engine; and wherein said at least one lower cross member is detachably secured to said side assemblies.

28. The independent suspension system of claim 27 wherein said at least one lower cross member is secured to said side assemblies with threaded fasteners.

29. The independent suspension system of claim 28 wherein said at least one lower cross member defines a secured position when said threaded fasteners are securing said at least one lower cross member to said chassis and said at least one lower cross member is supportable on said chassis in said secured position when said threaded fasteners are removed.

\* \* \* \* \*